Figure 1:
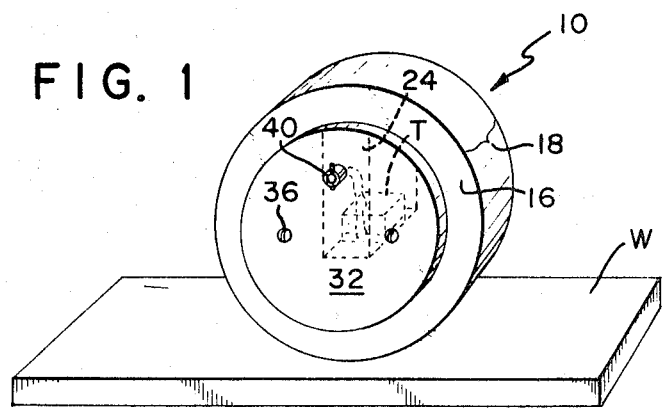

United States Patent

[11] 3,612,920

| [72] | Inventors | Walter J. Bantz;<br>Chan-Koo Chung, both of Stamford, Conn. |
|---|---|---|
| [21] | Appl. No. | 77,877 |
| [22] | Filed | Oct. 5, 1970 |
| [45] | Patented | Oct. 12, 1971 |
| [73] | Assignee | Branson Instruments, Incorporated<br>Stamford, Conn. |

[54] WHEEL-TYPE TRANSDUCER PROBE
9 Claims, 3 Drawing Figs.

[52] U.S. Cl. .................................................. 310/8.1,
73/67.6, 310/8.7
[51] Int. Cl. ...................................................... H01v 7/00
[50] Field of Search........................................... 310/8, 8.1,
8.3, 8.7; 73/67.5–67.9, 71.5; 340/10

[56] References Cited
UNITED STATES PATENTS

| 3,423,993 | 1/1969 | Lynnworth.................. | 310/8.7 X |
| 3,573,515 | 4/1971 | Stombaugh................... | 310/8.3 |
| 3,257,843 | 6/1966 | Cowan .......................... | 310/8.7 X |
| 3,379,902 | 4/1968 | Harris et al. .................. | 310/8.5 |

*Primary Examiner*—D. F. Duggan
*Assistant Examiner*—B. A. Reynolds
*Attorney*—Ervin B. Steinberg ABSTRACT: A wheel-type ultrasonic transducer probe comprises a hub portion and a rotatable rim portion, both made of substantially rigid thermoplastic material. The probe is dimensioned to be useful for thickness gauging and to this end is constructed to cause the ultrasonic signal to transverse equal distances in the hub portion and rim portion.

PATENTED OCT 12 1971 3,612,920

WALTER J. BANTZ
CHAN-KOO CHUNG
INVENTORS.

BY:

Ervin B. Steinberg

WHEEL-TYPE TRANSDUCER PROBE

This invention refers to a wheel-type transducer probe for pulse-echo ultrasonic testing. The present invention, moreover, is related to a search wheel assembly as shown, for instance, in U.S. Pat. No. 3,442,119 entitled "Ultrasonic Search Wheel Assembly" issued to G. de G. Cowan dated May 6, 1969; U.S. Pat. No. 2,545,101 entitled "Rotating Diaphragm Transducer for Solid Material Testing" issued to Marcel Meunier on Mar. 13, 1951; and U.S. Pat. No. 3,257,843 entitled "Ultrasonic Inspection Apparatus" issued to J. V. Cowan on June 28, 1966.

The patents referred to above disclose ultrasonic search wheel probes which are adapted to be rolled over a surface while ultrasonic search pulses are periodically propagated from the probe into the workpiece. Search wheel constructions of the type exemplified by the above-stated patents are generally liquid filled tires having a flexible rubber or neoprene rim which is adapted to flex so as to follow the contours of the workpiece. An electroacoustic transducer which provides the ultrasonic search energy and receives echo signals is disposed at the inside of the tire. This probe construction is rather cumbersome and expensive.

Moreover, wheel constructions of the type exemplified by the prior art for several reasons are not readily useful for ultrasonic thickness gauging of thin workpieces. Firstly, the rubber or neoprene covering causes a considerable loss of ultrasonic energy and this energy loss constitutes a serious disadvantage when it is necessary to detect a succession of rear surface echoes as is frequently done in gauging thin metal sheets. The severe signal attenuation encountered leaves little energy for multiple echo detection. Secondly, the wall thickness of the flexible rim or tire is relatively thin. The reflection signals generated at the inside and outside surface of the tire interfere with the receipt and recognition of echo signals from the workpiece surfaces when gauging relatively thin material, that is material in the range from 0.0005 to about 0.300 inch. Thus, the heretofore known search wheel probes are not useful for thin material gauging. Thirdly, the wheel constructions exemplified by the prior art are relatively large in size, complex, heavy and cumbersome to operate, and last but not least expensive.

The present invention discloses a simplified search wheel probe specifically designed for ultrasonic thickness gauging of sheet metal, and while not designed to have a flexible outer covering, it is nevertheless useful for gauging thin sheet metal which, in most instances, is flat and characterized by a smooth surface. Moreover, the transducer probe disclosed in the following description is relatively inexpensive, simple to operate and to repair, and is readily provided with a new rotating rim portion.

One of the principal objects of this invention is, therefore the provision of a novel wheel-type transducer probe for pulse-echo ultrasonic testing.

Another object of this invention is the provision of a simplified search wheel designed for ultrasonic thickness gauging of flat sheet type workpieces.

Another important object of this invention is the provision of a relatively inexpensive and simple rotatable transducer probe.

Figure 2:
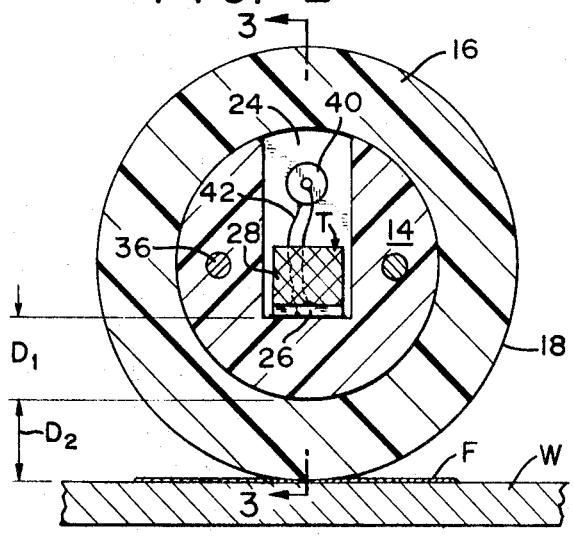
Figure 3:
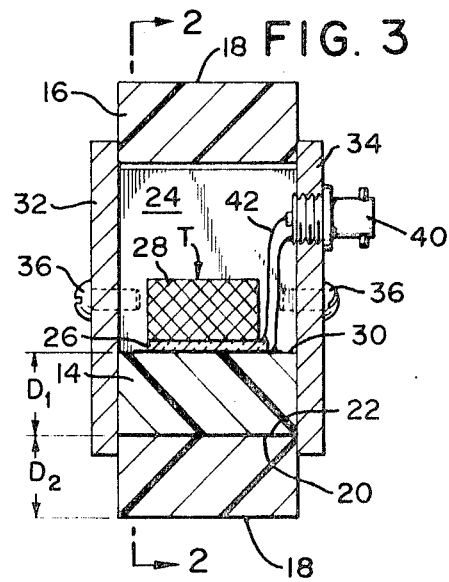

Further and still other objects of this invention will be more clearly apparent by reference to the following description when taken in conjunction with the accompanying drawing, in which:

FIG. 1 is a perspective view of the transducer probe;
FIG. 2 is a sectional view along lines 2—2 in FIG. 3, and
FIG. 3 is a sectional view along lines 3—3 in FIG. 2.

Referring now to the figures, numeral 10 identifies the wheel-type transducer probe which is placed upon a workpiece W whose thickness is to be gauged by ultrasonic pulse-echo techniques well known to those skilled in the art.

The probe comprises an inner hub 14 and an outer rim 16, both made of substantially rigid material, such as polystyrene thermoplastic material which presents comparatively little attenuation to ultrasonic energy in the frequency range normally employed for pulse-echo testing. The rim 16 is of annular shape and has a peripheral surface 18 for rolling contact with the exposed surface of the workpiece W. The inner surface 20 of the rim 16 is in sliding contact with the peripheral surface 22 of the hub 14. The hub 14, of circular cross section, is provided with a radially disposed inner recess 24 in order to accommodate a transducer T having a piezoelectric element 26 and a damping load 28 as is well understood in the art. The piezoelectric element 26 is in acoustic energy transfer contact with the surface 30 of the hub recess by means of a thin layer of electrically conductive epoxy material or other suitable bonding agent. A set of metal sideplates 32 and 34 hold the rim 16 and hub 14, in assembled condition, and suitable fastening means, such as screws 36, extend from the respective sideplates into the hub 14, thereby maintaining the assembly in operative condition.

For operation, the abutting surfaces 20 and 22 are provided with a thin couplant film, such as glycerine or oil, in order to provide for the transmission of ultrasonic energy between the hub and rim. A reservoir of such couplant film may be maintained in the recess 24. Although there may be some leakage of couplant film to the exterior, this is of no serious consequence because a couplant film F is also interposed between the workpiece surface and the peripheral surface 18 of the rim during thickness gauging. Since the couplant film provided in the transducer probe is not under pressure, leakage of the couplant is quite insignificant.

A connector 40 fastened to the plate 34 via conductors 42 establishes electrical circuit connection to the piezoelectric element 26. A cable (not shown) connects the transducer to a conventional pulse-echo instrument.

One of the important design considerations of the present probe resides in the feature that the dimension $D_1$ equals the dimension $D_2$ that is the transit time of the ultrasonic signal from the hub surface 30 to the surface 22 equals the transit time of this signal from the surface 20 to the peripheral surface 18. This causes the interface echo signals arising at the surfaces 20 and 22, and 18 and the workpiece surface to be substantially coincident when displayed along the time axis and give the appearance of a single, well defined signal. Moreover, by selecting the distances $D_1$ and $D_2$ in such a manner as to provide a relatively large time delay when compared with the transit time of the ultrasonic signal in the workpiece W to be tested, relatively thin materials can be gauged and multiple surface reflections can be obtained therefrom before receiving the delay line interface echo signals. In a particular case and using polystyrene thermoplastic material the distances $D_1$ and $D_2$ were selected to be one-half inch.

During operation the probe is grasped at the sideplates 32 and 34 and drawn across the workpiece to be gauged. The rim then rotates about the hub. In order to assure that the transducer T is properly aligned and remains aligned to provide an ultrasonic signal which is normal to the workpiece surface, an extension arm with separate wheel can be fastened to the side plates to cause the transducer T to remain in the desired aligned position.

In the event the surface 18 becomes damaged and needs to be replaced, one or both of the sideplates are removed, the rim 16 is slid off the hub 14 and a new rim put in place. It will be apparent that this procedure can be accomplished with a minimum of tools and in an extremely brief period of time. Thus it is evident that the above construction of a wheel-type transducer probe is characterized by extreme simplicity and ease of operation.

What is claimed is:
1. A wheel-type transducer probe comprising:
a hub of substantially rigid material having a circular peripheral surface;
an annularly shaped rim of substantially rigid material disposed on and for rotation about said peripheral surface of said hub, said peripheral surface and inner surface of said rim being in sliding contact with each other;

a piezoelectric element disposed in said hub for transmitting when energized with electrical energy an ultrasonic signal in a radial direction through a portion of said hub toward said peripheral surface and rim, and a liquid couplant film disposed between said sliding contact surfaces at least at the location at which the signal from said element is transmitted from said hub to said rim.

2. A wheel-type transducer probe as set forth in claim 1, said hub and rim being made of polymeric synthetic material.

3. A wheel-type transducer probe as set forth in claim 2, said synthetic material being polystyrene.

4. A wheel-type transducer probe as set forth in claim 1, said piezoelectric element being disposed in such a manner that the distance traversed by the ultrasonic signal in the hub is substantially equal to the distance traversed by the ultrasonic signal in said rim.

5. A wheel-type transducer probe as set forth in claim 1, said rim having a thickness of at least one-fourth inch.

6. A wheel-type transducer probe as set forth in claim 1, said hub including means for storing a supply of liquid couplant film which is adapted to flow into the space between said sliding contact surfaces.

7. A wheel-type transducer probe as set forth in claim 1, and a pair of side plates disposed for supporting said hub within said rim, electrical connector means mounted to one of said side plates, electrical conductor means connecting said connector means with said piezoelectric element, and fastening means disposed for holding said side plates against said hub and said rim.

8. A wheel-type transducer probe as set forth in claim 7, said side plates being metallic.

9. A wheel-type transducer probe as set forth in claim 1, said hub having a radially disposed recess, said piezoelectric element being bonded to a surface of said recess.